May 16, 1933.  F. W. PARSONS, SR  1,909,004
PISTON AND ROD CONNECTION
Filed Nov. 25, 1931

INVENTOR.
Frederick W. Parsons Sr
BY
HIS ATTORNEY.

Patented May 16, 1933

1,909,004

UNITED STATES PATENT OFFICE

FREDERICK W. PARSONS, SR., OF CORNING, NEW YORK, ASSIGNOR TO INGERSOLL-RAND COMPANY, OF JERSEY CITY, NEW JERSEY, A CORPORATION OF NEW JERSEY

PISTON AND ROD CONNECTION

Application filed November 25, 1931. Serial No. 577,260.

This invention relates to pistons, but more particularly to a connecting device for fastening a piston rod to the piston.

A few of the objects of the invention are to assure a rigid connection between the piston and the piston rod, to prevent distortion of the piston, to enable the rod to be readily attached to or disconnected from the piston, and to maintain the cost of construction of devices of this character to a minimum.

Other objects will be in part obvious and in part pointed out hereinafter.

Figure 1:
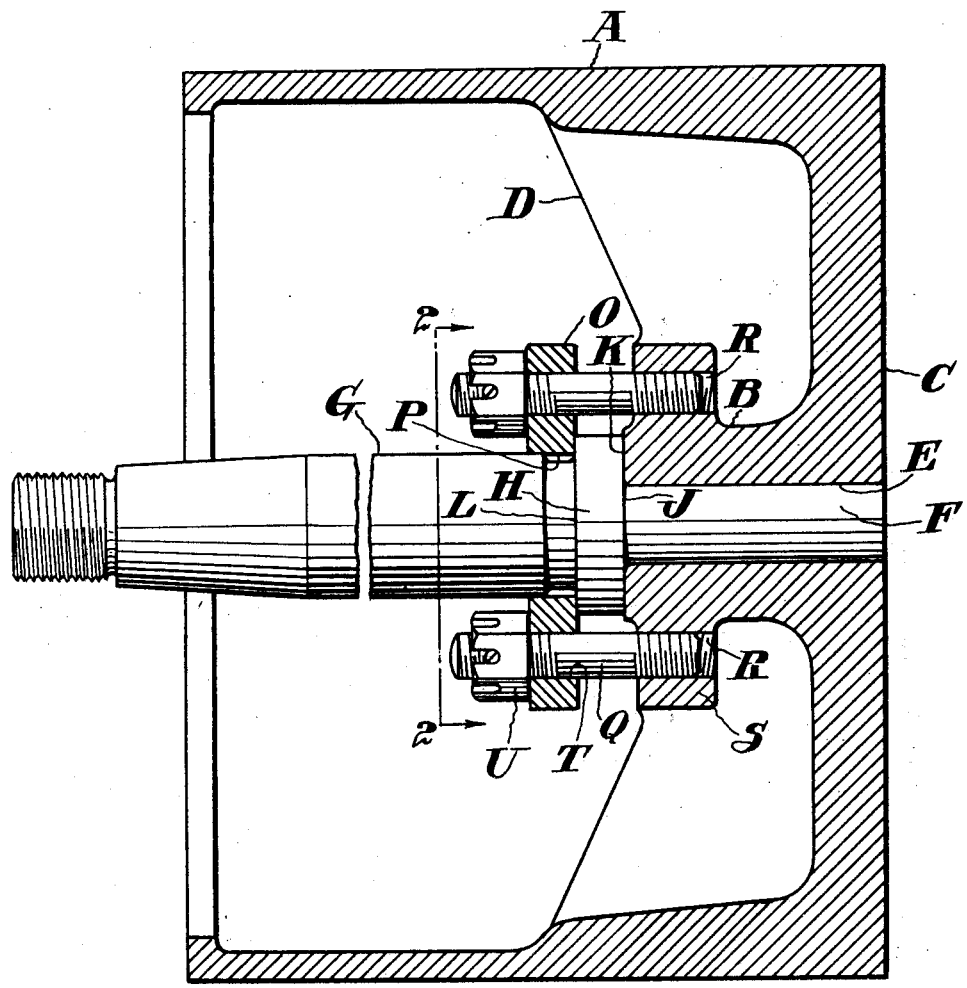
Figure 2:
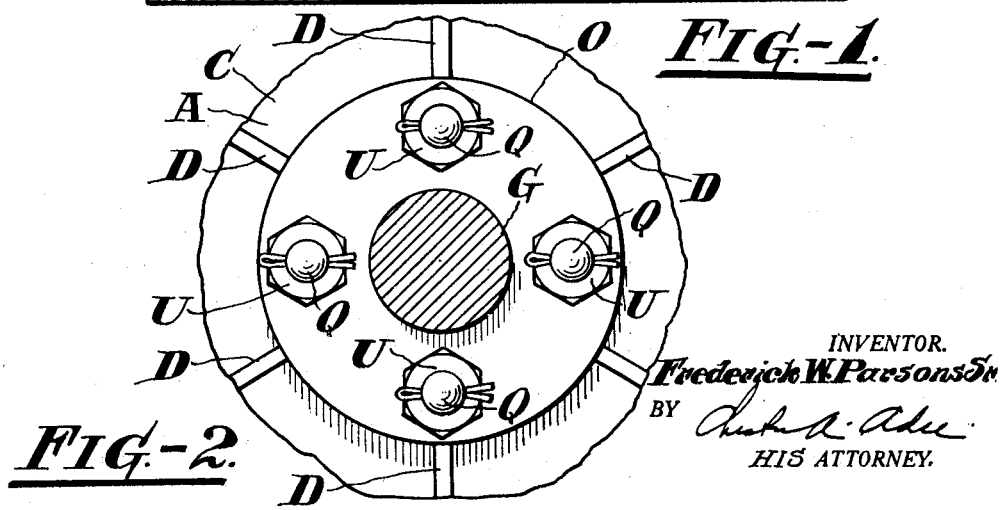

In the accompanying drawing forming a part of the specification and in which similar reference characters refer to similar parts, Figure 1 is an elevation partly in section of a piston and a rod constructed in accordance with the practice of the invention, and Figure 2 is a transverse view taken through Figure 1 on the line 2—2 looking in the direction indicated by the arrows.

Referring more particularly to the drawing, A designates a piston having a central hub B connected to the end wall C of the piston. The hub B which lies on the inner surface of the end wall is of less length than the piston and ribs D radiate from the hub B and are joined to the wall of the piston to render said hub B rigid.

Within the hub B and preferably extending through the end wall C is an aperture E of cylindrical shape to receive a correspondingly shaped extension F of a piston rod G. At the juncture of the rod G and the extension F is an enlargement or flange H of which the side or surface J adjacent the extension F is adapted to seat against a surface K on the free end of the hub B. The opposite side or end of the flange H constitutes a seating surface L for a ring member O having an aperture P to accommodate the rod G. The ring O, as indicated, consists of a single piece and is adapted to be disposed slidably over the rod G.

The means provided for clamping the ring O against the flange H and the flange H in turn against the hub B consists, in the present instance, of bolts Q of the stud type threaded with one end into apertures R located in ribs or lugs S which radiate from the hub B and may be connected to the radial ribs D. The bolts Q extend through apertures T in the ring O and have nuts U threaded thereon to seat against the ring O.

In practice the present invention has been found to be highly efficient and satisfactory. Owing to the provision of the cylindrical extension F on the rod G and by seating it in the cylindrical aperture in the piston A the rod G and the piston A may be conveniently arranged and maintained in concentric relationship. By securing or clamping the rod to the piston in the manner described the piston will be protected against distortion and undue strains such as frequently occur in structures in which the locating means, as for instance, the extension F and the bore wherein it seats are of tapered form. The extension F is preferably a slip fit in the piston so that any strains to which the piston may be subjected will act entirely longitudinally of the piston instead of in a radial direction.

It will further be apparent that whenever it may be desired to disassemble the rod and the piston, this operation may be conveniently and readily accomplished by merely removing the nuts U. The rod G and the ring O may then be removed from the piston. Another highly desirable advantage of the piston is that the rod G may be conveniently machined from bar stock and its manufacture does not necessitate the expense of forging operations which add greatly to the cost of manufacturing devices of this character.

As will be observed the elements, such as the ring O, the bolts Q and the flange H, which serve to secure the rod to the piston lie wholly within the piston thus making it possible for the piston ends to closely approach the ends of a chamber wherein it operates.

I claim:

In combination, a piston having an end wall, a hub on the inner surface of the end wall and having a cylindrical aperture, a rod, a cylindrical extension on the rod and extending into the aperture, there being a flange on the rod that seats against the hub, a ring seated against the flange, and bolts to clamp the flange between the piston and the ring, said flange, bolts and ring lying wholly within the piston.

In testimony whereof I have signed this specification.

FREDERICK W. PARSONS, Sr.